US008614521B2

(12) United States Patent
Babarit et al.

(10) Patent No.: US 8,614,521 B2
(45) Date of Patent: Dec. 24, 2013

(54) DEVICE FOR CONVERTING WAVE ENERGY INTO USEABLE ENERGY, PARTICULARLY ELECTRICAL ENERGY, AND ASSOCIATED METHOD

(75) Inventors: Arélien Babarit, Nantes (FR); Michel Guglielmi, Nantes (FR); Alain Clement, Nantes (FR)

(73) Assignees: Ecole Centrale de Nantes (FR); Centre National de la Recherche Scientifique (CNRS) (FR)

( * ) Notice: Subject to any disclaimer, the term of this patent is extended or adjusted under 35 U.S.C. 154(b) by 522 days.

(21) Appl. No.: 12/996,123

(22) PCT Filed: Jun. 3, 2009

(86) PCT No.: PCT/EP2009/056775
§ 371 (c)(1),
(2), (4) Date: Dec. 3, 2010

(87) PCT Pub. No.: WO2009/147160
PCT Pub. Date: Dec. 10, 2009

(65) Prior Publication Data
US 2011/0089690 A1    Apr. 21, 2011

(30) Foreign Application Priority Data

Jun. 4, 2008  (FR) ...................................... 08 53695

(51) Int. Cl.
*F03B 13/10* (2006.01)
(52) U.S. Cl.
USPC .............................................. 290/53; 290/42
(58) Field of Classification Search
USPC ........................................ 290/42, 43, 53, 54
See application file for complete search history.

(56) References Cited

U.S. PATENT DOCUMENTS

| 4,110,630 | A  | * | 8/1978  | Hendel ........................... 290/53 |
| 7,759,813 | B2 | * | 7/2010  | Fujisato ......................... 290/53 |
| 7,989,975 | B2 | * | 8/2011  | Clement et al. ................. 290/53 |
| 8,046,108 | B2 | * | 10/2011 | Hench ........................... 700/286 |

(Continued)

FOREIGN PATENT DOCUMENTS

| FR | 2384961 A1 | 10/1978 |
| FR | 2876751 A1 | 4/2006 |

(Continued)

OTHER PUBLICATIONS

Babarit et al., "Optional latching control of a wave energy device in regular and irregular waves", 2006, Applied Ocean Research vol. 28, pp. 77-91.

(Continued)

*Primary Examiner* — Nicholas Ponomarenko
(74) *Attorney, Agent, or Firm* — Lerner, David, Littenberg, Krumholz & Mentlik, LLP

(57) ABSTRACT

The invention relates to a device (1) for converting the energy of the swell and of waves into useable energy, particularly electrical energy, comprising a float element (2), an oscillating element (3) mounted such that it can move with respect to the float element, the oscillating element (3) being able to be set in relative motion with respect to the float element (2) under the action of the waves on the float element and means (4) for converting the movement of the oscillating element (3) into useable energy, particularly electrical energy, the device (1) also comprising braking means (5) capable selectively of immobilizing or releasing the oscillating element (3) with respect to the float element, clutch means (7) able selectively to couple or to uncouple the conversion means (4) and the oscillating element (3), and control means (8) for controlling the braking means (5) and the clutch means (7) as the swell evolves.

6 Claims, 4 Drawing Sheets

(56) References Cited

U.S. PATENT DOCUMENTS

Figure 1:
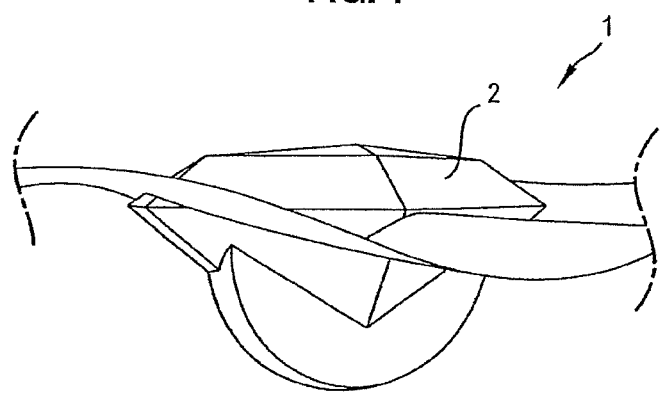

| | | | |
|---|---|---|---|
| 8,198,745 B2 * | 6/2012 | Laz et al. | 290/53 |
| 8,269,365 B2 * | 9/2012 | Clement et al. | 290/53 |
| 8,330,286 B2 * | 12/2012 | Laz et al. | 290/42 |

FOREIGN PATENT DOCUMENTS

| WO | 2005045243 A1 | 5/2005 |
|---|---|---|
| WO | 2007137426 A1 | 12/2007 |

OTHER PUBLICATIONS

Hoskin et al., Utilization of Ocean waves: Wave to energy conversion <Optional strategies for phase control of wave energy devices>, American Society of Civil Engineers, 1985, p. 184-199.
International Search Report for Application No. PCT/EP2009/056775 dated Sep. 11, 2009.

* cited by examiner

DEVICE FOR CONVERTING WAVE ENERGY INTO USEABLE ENERGY, PARTICULARLY ELECTRICAL ENERGY, AND ASSOCIATED METHOD

FIELD OF THE INVENTION

The invention relates to a device for converting energy from waves and swell into useable energy, notably electrical energy.

STATE OF THE ART

Devices for converting the energy from the waves and from the swell into electrical energy, so-called "wave power" devices allow production of electricity from a source of renewable energy (the potential and kinetic energy of the waves) without any emission of green house gases.

Some of these devices comprise one or more oscillating elements set into motion by the action of the waves and means allowing the movement of the oscillating elements to be converted into electric current. Control strategies acting on the movement of the oscillating elements have been developed in order to optimize the yield of these devices.

Document FR 2 876 751 A1 describes an apparatus for converting energy from waves into electrical energy. The apparatus comprises a closed float element and an element forming a mass positioned inside the float element. The mass forming element is a pendular wheel mounted so as to be mobile around a horizontal axis relatively to the float element. The wheel is set into motion by the action of the waves which causes the float element to oscillate. The apparatus also comprises blocking means for selectively blocking or releasing the mass forming element and control means for controlling the blocking means so as to amplify the movement of the mass forming element by continual adaptation of the dynamics of the apparatus to successive waves.

With the blocking means, it is possible to have the mass forming element successively pass from a blocked state relatively to the float element to a free state. A suitable control of the blocking means allows an increase in the energy yield of the apparatus. The performance of this type of two-state control (blocked/released or latching control) lies on the determination of the instant for switching from one state to the other. A suitable selection of this switching instant allows a resonance of the mass-float mechanical system to be generated and then sustained at frequencies other than the natural eigenfrequency(ies) of the system.

The blocked-released control has the effect of lowering the eigenfrequency of the system, in other words of extending the eigenperiod of the mechanical system. This type of control is therefore particularly effective when the frequency of the swell is less than the natural eigenfrequency of the system, in other words when the period of the swell is greater than the natural eigenperiod of the system.

However, as the actuations of the waves are naturally random in period, amplitude, direction, . . . , it is necessary to adapt in real time, wave after wave, the mass-float mechanical system to the dynamics of the actuations in order to sustain a resonant state.

The document, A. Babarit, A. H. Clement *Optimal latching control of a wave energy device in regular and irregular waves,* 2006, Applied Ocean Research Vol. 28, pp. 77-99, for example describes two control methods for such a latching control. The first method is based on the analytical solution of the equation of motion of a wave powered device (WEC) subject to regular swell, by using matrix exponentials. This first method may be used for calculating an optimum blocking time. The second method is derived from the theory of optimal control. This second method is based on a formulation of a Hamiltonian formulation and on Pontryagin's maximum principle. Simple modelling is used for describing the latching control before applying the theory of optimal control.

SUMMARY OF THE INVENTION

An object of the invention is to further increase the energy yield of a wave power device with oscillating element(s).

This problem is solved within the scope of the present invention by means of a device for converting swell energy into electrical energy, comprising a float element, an oscillating element mounted so as to be mobile relatively to the float element, the oscillating element being capable of being set into relative motion with respect to the float element under action of the swell on the float element and means for converting the movement of the oscillating element into useable energy, in particular electrical energy, the device also comprising braking means capable of selectively blocking or releasing the oscillating element relatively to the float element, clutch means capable of selectively coupling or uncoupling the conversion means and the oscillating element, and control means for controlling the braking means and the clutch means as a function of a fluctuation of the swell.

Thanks to the braking and clutch means, the device may be controlled according to three states:
  a first clutched state, in which the oscillating element drives the conversion means and produces useable energy, notably electrical energy,
  a second blocked state, in which the oscillating element is immobilized relatively to the float element, also immobilizing the conversion system which then no longer produces any energy,
  a third declutched state, in which the non-blocked oscillating element is free to move relatively to the float element and does not drive the conversion means which then no longer produce any energy.

With the third state, it is possible to obtain a more significant acceleration of the oscillating element than when the oscillating element drives the conversion means. During this acceleration, the oscillating element therefore stores mechanical energy (kinetic and potential energy) which it may release during a subsequent oscillation, when the oscillating element will again be coupled to the conversion means.

By suitable control of the braking means and of the clutching means, the device allows substantial improvement in the energy yield of the conversion.

The device may further have the following characteristics:
  the control means are capable of receiving at the input, signals from sensors measuring an amplitude of the swell upstream from the device and of generating at the output, control signals for controlling the braking means and the clutching means,
  the means for controlling the control means are programmed so as to execute the steps of:
  evaluating the states of the device depending on the fluctuation of the swell from a modelling of the device,
  calculating an optimization criterion parameter of the control depending on the states of the device,
  elaborating control signals for controlling the braking means and the clutching means, so as to maximize the criterion parameter
  the control means repeat the preceding steps in order to obtain convergence of the calculated control signals.

The invention also relates to a method for converting swell energy into useable energy notably electrical energy, in which a device as defined earlier is subject to the action of the swell and the control means control the braking means and the clutching means depending on the fluctuation of swell and of the waves.

The invention also relates to a computing piece of equipment intended to be put onboard a device as defined earlier, the piece of equipment being programmed in order to control the braking means and the clutching means depending on the fluctuation of the swell and of the waves.

PRESENTATION OF THE FIGURES

FIG. 1 schematically illustrates in a perspective view, the outer view of a device for converting swell energy into electrical energy, according to an embodiment of the invention.

Figure 2:
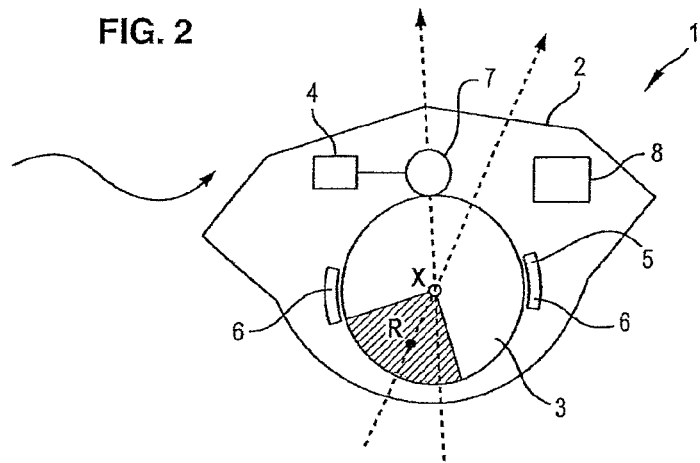
Figure 3:
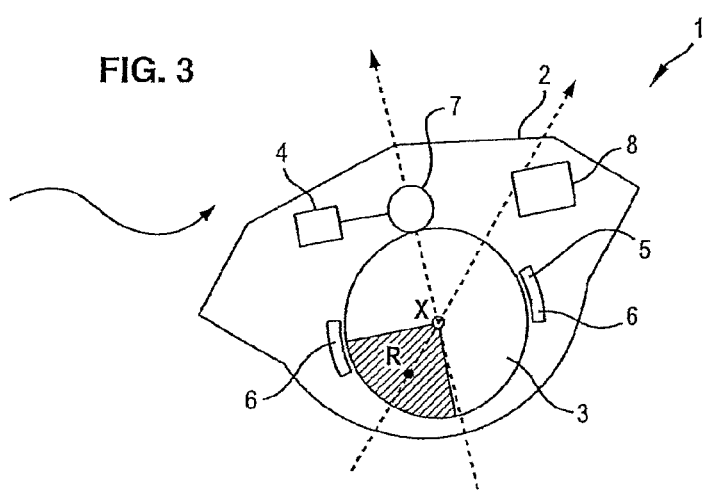
Figure 4:
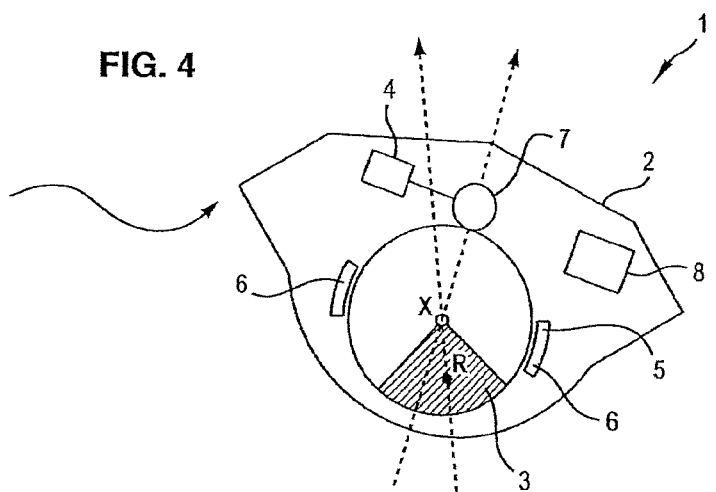
Figure 5:
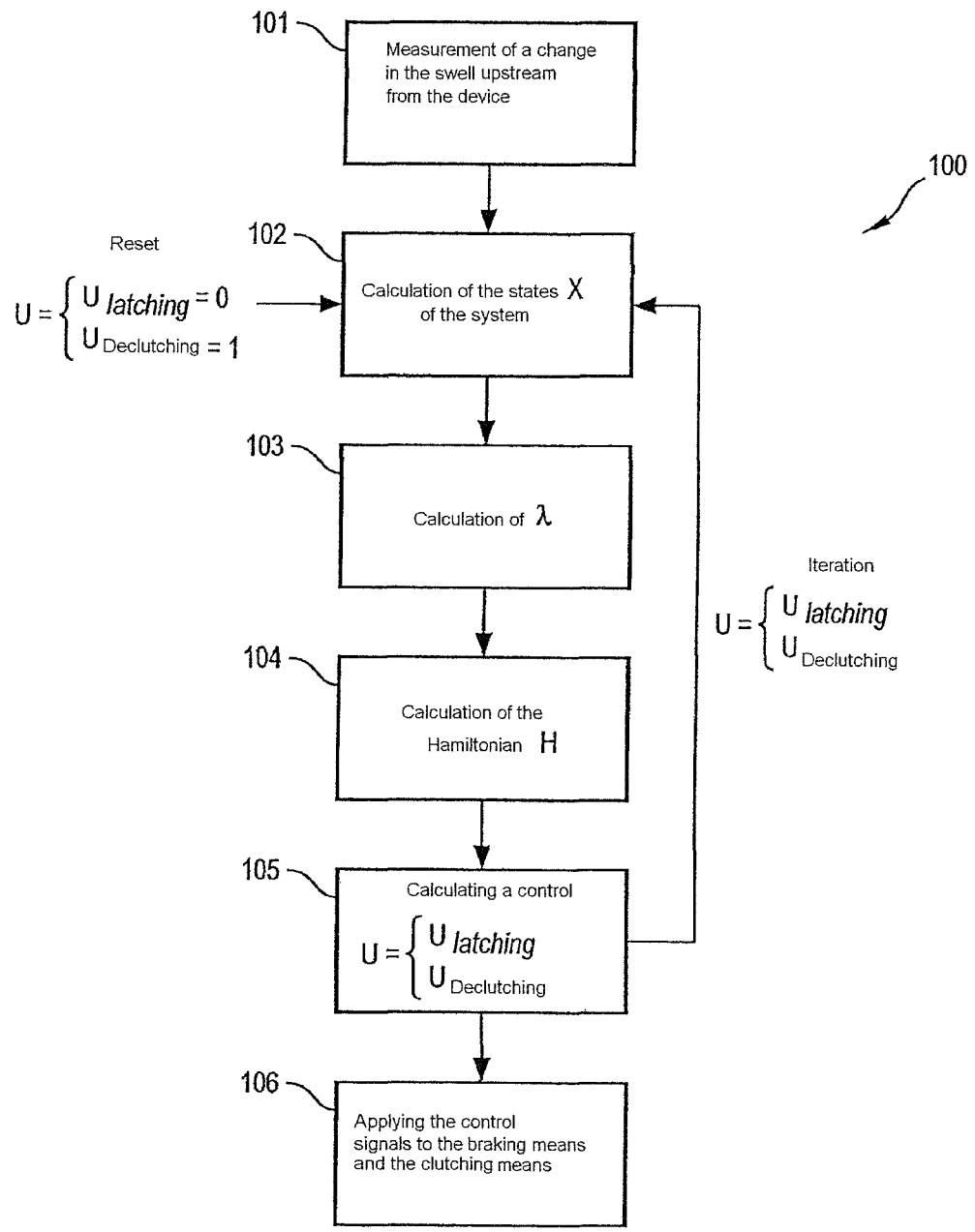
Figure 6:
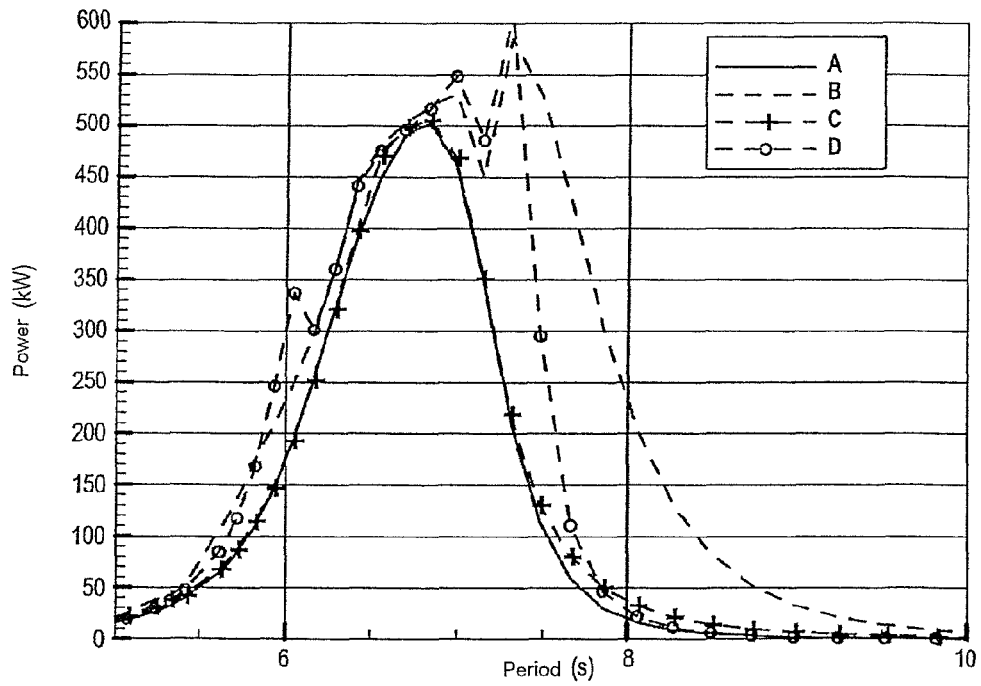
Figure 7:
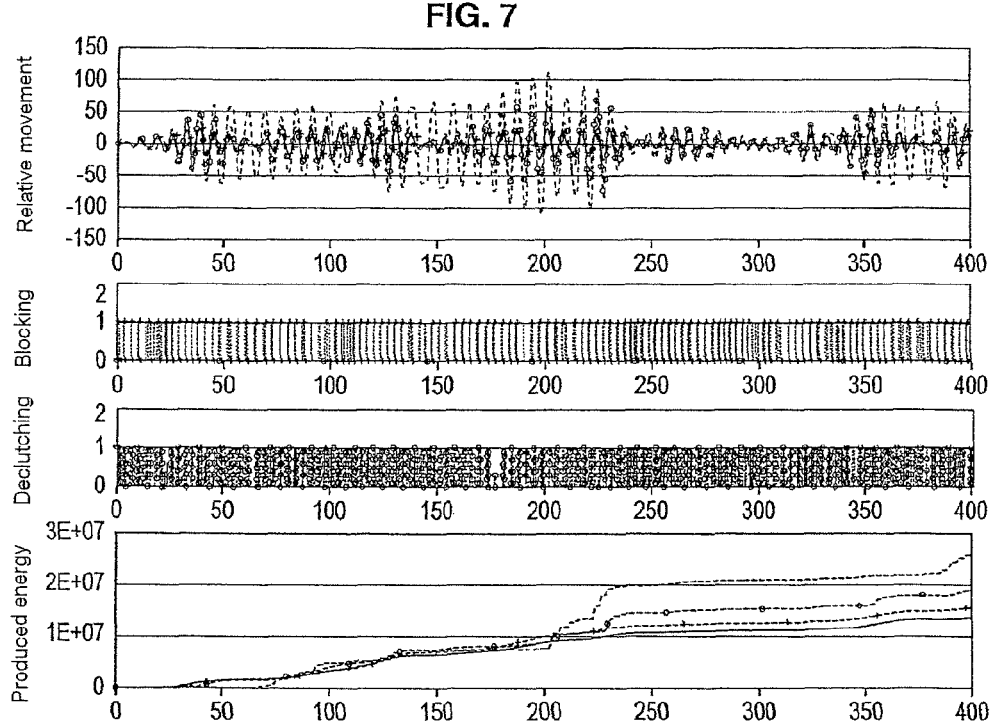

FIG. 2 schematically illustrates a device for converting swell energy into electrical energy in a first so-called "clutched" state, FIG. 3 schematically illustrates the device in the second so-called "blocked" state, FIG. 4 schematically illustrates the device in a third so-called "declutched" state, FIG. 5 is a diagram schematically illustrating the steps of a method for controlling the device according to an embodiment of the invention, FIG. 6 is a diagram schematically illustrating the electric power generated by the device versus the period of the swell for a device without any control, for a device controlled with a three-state control, for a device controlled with a two-state control, FIG. 7 is a diagram schematically illustrating an example of a time-dependent change of the relative movement of the oscillating element relatively to the float element, the blocking control signal, the declutching control signal and the electric energy produced by the device versus time.

DETAILED DESCRIPTION OF AN EMBODIMENT

In FIGS. 1 to 4, the illustrated device 1 comprises a float element 2 in the form of a closed sealed casing, an oscillating element 3 positioned inside the casing and rotatably mounted relatively to the latter, as well as means 4 for converting the movement of the oscillating element into electrical energy.

The float element 2 is intended to be immersed in the water.

The oscillating element 3 is a pendular wheel, rotatably mounted around a horizontal axis relatively to the float element 2. The pendular wheel has a general cylindrical shape. The pendular wheel may rotate on itself relatively to the float element around an axis of rotation X which coincides with the geometric axis of the cylinder. Further, the pendular wheel has a centre of gravity R off-centered relatively to the axis of rotation X.

The float element 2 has a shape such that the device is naturally oriented with a longitudinal axis in the main propagation direction of the waves. This characteristic has the effect that the axis of rotation X of the oscillating element 3 is always oriented perpendicularly to the main propagation direction of the waves in order to obtain maximum actuation of the oscillating element.

In such a device, the rotation of the oscillating element 3 is neither limited by the inner space of the float element 2, nor by the conversion means 4. Thus, this device 1 does not require any specific means at the end of travel. In the case of a strong swell, the oscillating element 3 may freely execute a complete turn on itself without damaging the structure of the device or any internal component.

The conversion means 4 comprise a hydraulic/electrical converter which is capable of being driven by the movement of the oscillating element 3. The converter converts the movement of the oscillating element into electrical energy. The produced electrical energy may be stored on site or conveyed to a remote site through a flexible electrical cable.

The device 1 further comprises braking means 5 capable of selectively blocking or releasing the oscillating element 3 relatively to the float element 2. The braking means 5 comprise a pair of disc brakes 6 capable of being put into contact with the oscillating element 3 in order to immobilize it relatively to the float element 2.

The device 1 also comprises clutching means 7 capable of selectively coupling or uncoupling the conversion means 4 and the oscillating element 3. When the conversion means 4 are coupled with the oscillating element 3, the oscillating element 3 drives the conversion means 4. When the conversion means 4 are uncoupled from the oscillating element 3, the movement of the oscillating element 3 is no longer transmitted to the conversion means 4.

The device finally comprises on-board control means 8 for controlling the braking means 5 and the clutching means 7 depending on how the swell evolves. The on-board control means 8 comprise a programmed computer for executing an algorithm for controlling the braking means 5 and the clutching means 7.

The computer receives as an input, signals from sensors notably measuring the movements of the float element 2 and of the oscillating element 3, the amplitude of the waves versus time and generates, at the output, control signals towards the braking means 5 and the clutching means 7.

The amplitude of the waves may be measured by means of sensors laid out in a measuring buoy positioned upstream from the device 1 relatively to the direction of movement of the swell. Thus, the time-dependent change in the waves is measured by the sensors in advance relatively to the moment of their effective action on the float element 2.

In FIG. 2, the device 1 is illustrated in a first so-called "clutched" state, in which the device produces electrical energy. In this state, the conversion means 4 are coupled to the oscillating element and the braking means are not actuated. The oscillating element is set into motion relatively to the float element under the action of the swell on the float element and the conversion means convert the movement of the oscillating element into electrical energy.

In FIG. 3, the device 1 is illustrated in a second so-called "blocked" state, in which the braking means are actuated. In this state, the disc brakes are in contact with the oscillating element and prevent any movement of the oscillating element relatively to the float element. The contacting of the disc brakes with the oscillating element is generally controlled when the relative velocity of the oscillating element relatively to the float element is zero, which minimizes the energy required for braking.

In FIG. 4, the device 1 is illustrated in a third so-called "declutched" state, in which the conversion means 4 are uncoupled from the oscillating element and the braking means are not actuated. In this state, the oscillating element is free to move relatively to the float element under the action of the waves, but the device 1 does not produce any electrical energy. Because the oscillating element is free, it may accelerate faster than when the device is in the clutched state, which allows it to store mechanical energy (kinetic and potential energy) which it may release subsequently when the conversion means will again be coupled to the oscillating element.

The on-board control means 8 control in real time the braking means and the clutching means so as to cause the device to sequentially pass into the three states "clutched", "declutched", "blocked" state, which have just been defined, depending on how the swell evolves.

Modelling the System

The system may be modelled in the following way:

$$\dot{X}=f(t,X,u)$$

Wherein:

X is the state vector system, t is the time, u is the control.

The control u is broken down into a braking control ($u_{latching}$) and a clutching control ($u_{clutching}$) which may assume the following values:

$u_{latching}=0$ controls the unblocking of the oscillating element, $u_{latching}=1$ controls the blocking of the oscillating element, $u_{declutching}=0$ controls the decoupling of the conversion means, $u_{declutching}=1$ controls the coupling of the conversion means.

The device is therefore controlled according to three states:

|  |  | Control signal for the braking means | |
|---|---|---|---|
|  |  | $u_{latching} = 0$ | $u_{latching} = 1$ |
| Control signal for the clutching means | $u_{latching} = 0$ | State 3 Declutched (FIG. 4) | State 2 Blocked (FIG. 3) |
|  | $u_{declutching} = 1$ | State 1 Clutched (FIG. 2) |  |

Control by Maximizing the Absorbed Energy

A control strategy by maximization of the absorbed energy was described by R. E. Hoskin and N. K. Nichols, *Utilization of Ocean waves: Wave to Energy Conversion <<Optimal strategies for phase control of wave energy devices>>*, American Society of Civil Engineers, 1985, p. 184-199.

The maximum electrical energy generated by the system is defined as:

$$\max(E) = \int_t^{t+\Delta t} F_{conversion} \cdot u \cdot dt$$

A Hamiltonian operator is defined as:

$$H = P + \lambda^t \cdot F$$

Wherein:

$\lambda^t$ are the adjoint states of the system.

$$\dot{\lambda} = \frac{\partial H}{\partial X}$$

$$H = g(X, t) + c \cdot \lambda_j \cdot \dot{\alpha} \cdot u_{latching} + d \cdot \dot{\alpha} \cdot (\Lambda - \dot{\alpha}) \cdot u_{declutching}$$

Wherein:

α is the relative angular velocity of the oscillating element relatively to the float element.

The control is considered as optimum when the Hamiltonian operator is maximum.

Algorithm for Calculating the Control

FIG. 5 illustrates steps of a method 100 for controlling the device. The control method is applied by the computer. The computer is programmed in order to execute the following steps:

According to a first step 101, the computer measures a time-dependent change of the swell upstream from the device over a predetermined time period Δt.

According to a second step 102, the computer calculates a variation of the states X of the system over the time period Δt. The variation of the states X is calculated depending on the measured time-dependent change of the swell and on the control u.

Initially, the control u is set to the following values:

$$u_{initial} = \begin{cases} u_{latching} & = 0 \\ u_{declutching} & = 1 \end{cases}$$

In other words, the signals for controlling the braking means and the clutching means are considered as constant, the system being found in a clutched state.

According to a third step 103, the computer calculates a change in the variation of the adjoint states of the system λ depending on the states X determined in the preceding step.

According to a fourth step 104, the computer calculates a variation of the Hamiltonian H depending on the adjoint states λ determined in the preceding step.

According to a fifth step 105, the computer calculates a variation of the control $$u = \begin{cases} u_{latching} \\ u_{declutching} \end{cases} \text{by}$$

maximization of the Hamiltonian.

Next the steps 102-105 are repeated on the basis of the thereby determined control u.

Steps 102-105 are renewed until the control signals $u_{latching}$ and $u_{declutching}$ converge.

According to a sixth step 106, the computer applies the thereby determined control signals to the braking means and to the clutching means, respectively.

Results

FIG. 6 is a diagram schematically illustrating the electric power generated by the device versus the period of the swell, for an exemplary device.

The relevant swell is regular and has an amplitude of 1 metre.

Three driving modes are illustrated:

a driving mode without any control (Curve A), a driving mode with a three-state control in accordance with the invention (Curve B), a driving mode with a blocked-released two-state control (Curve C) and, a driving mode with a clutched-declutched two-state control (Curve D).

It appears that in this example, the three-state driving mode (Curve B) provides the best performances, by considerably widening the bandwidth of the system.

Further, the gain obtained with this three-state driving mode (Curve B) is considerably larger than the sum of the gains obtained with the driving mode by control of the braking means alone (Curve C) and with the driving mode by control of the braking means alone (Curve D), respectively.

FIG. 7 illustrates the performances of each driving mode in a random swell. This figure illustrates:
- the history of the relative movement of the oscillating element relatively to the float element (position α versus time),
- the blocking control signal ($u_{latching}$) and/or the declutching control signal ($u_{declutching}$), and
- the energy produced by the device.

It appears that the driving mode with a three-state control provides in this example a significant gain on the energy production of the device, as compared with the driving mode without any control (a +85% gain), as compared with the driving mode with a blocked-released two-state control (+71% gain) and as compared with the driving mode with a clutched-declutched two-state control (+37% gain).

For example, when the driving with a three state control is applied to variations of swell from measurements on the sea, in proximity to the Isle of Yeu (Vendee, France), this driving mode enables an improvement in the yearly production of electric energy by about +70%.

The invention claimed is:

1. A device (1) for converting swell energy into a useable energy in particular electrical energy, comprising a float element (2), an oscillating element (3) mounted so as to be mobile relatively to the float element, the oscillating element (3) being capable of being set into relative motion with respect to the float element (2) under action of the swell on the float element and means (4) for converting the movement of the oscillating element (3) into useable energy in particular electrical energy, the device (1) also comprising braking means (5) capable of selectively blocking or releasing the oscillating element (3) with respect to the float element, clutching means (7) capable of selectively coupling or uncoupling the conversion means (4) and the oscillating element (3), and control means (8) for driving the braking means (5) and the clutching means (7) depending on how the fluctuation of swell.

2. The device according to claim 1, wherein the control means (8) are capable of receiving, as an input, signals from sensors measuring an amplitude of the swell upstream from the device (1) as well as movements of the float element (2) and those of the oscillating element (3), and of generating as an output, control signals (u) for controlling the braking means (5) and the clutching means (7).

3. The device according to any of claim 1 or 2, wherein the control means (8) are programmed so as to execute the steps of:
(102) calculating states (X) of the device according to the time-dependent fluctuation of the swell from mathematical modelling of the device,
(104) calculating a criterion parameter (H) for optimizing the control according to the states (X) of the device,
(105) calculating signals (u) for controlling the braking means and the clutching means, so as to maximize the criterion parameter.

4. The device according to claim 3, wherein the control means (8) repeat the steps (102) to (105) for obtaining convergence of the calculated control signals (u).

5. A method for converting swell energy into useable energy notably electrical energy, wherein a device according to any of claims 1 to 4 is subject to action of the swell and the control means (8) drive the braking means (6) and the clutching means (7) according to a time-dependent fluctuation of the swell.

6. A piece of computing equipment (8) intended to be put on-board a device according to any of claims 1 to 4, the piece of equipment being programmed in order to control the braking means (6) and the clutching means (7) as function of a time-dependent fluctuation of the swell.

* * * * *